Patented Mar. 10, 1953

2,631,177

UNITED STATES PATENT OFFICE 2,631,177

SOFTENING OF RUBBER

Charles Edwin Kendall, Castle Bromwich, Birmingham, and Manfred Landau, Edgbaston, Birmingham, England, assignors to Dunlop Tire and Rubber Corporation, Buffalo, N. Y., a corporation of New York No Drawing. Application June 30, 1951, Serial No. 234,651. In Great Britain May 26, 1950

2 Claims. (Cl. 260—761)

This invention relates to methods of softening rubber. It is known to soften unvulcanized rubber by masticating it on rolls or in an internal mixer; as mastication proceeds the rubber becomes softer and it is thus easier to mill into it subsequently sulphur, carbon black or other compounding materials. The processing of the compounded unvulcanized rubber by extrusion, molding or other power-consuming operations is also facilitated. The rolls or internal mixer permit access of atmospheric oxygen to the rubber and it is generally considered that softening is due to the action of oxygen on the rubber resulting in depolymerization of the rubber molecule, i. e. a rupture of the carbon chain of the molecule into shorter chains. It is also known that the softening of rubber in this way during mastication can be accelerated by having present a small proportion, based on the rubber, of certain compounds, for example, aryl mercaptans and mercaptothiazoles during mastication. These compounds are conveniently referred to as depolymerization promoters. The mercaptothiazoles are most frequently used for this purpose though they are expensive; another disadvantage is that on account of the large increase in the rate of acceleration of vulcanization which these compounds produce they are apt to cause scorching when the softened rubber is compounded with sulphur and other compounding ingredients or if the compounded unvulcanized rubber is stored.

Our present invention provides a method of softening unvulcanized rubber whereby scorching of the softened rubber on subsequent compounding or on storing of the compounded rubber is reduced or avoided and stickiness of the softened rubber is reduced while the rubber remains tacky.

In our invention we provide a process for softening unvulcanized rubber which comprises mechanically working the rubber in the presence of oxygen and a thiocarbonyl compound whose thiocarbonyl carbon atom is directly linked to two nitrogen atoms.

Compounds which may be used in accordance with the invention to soften unvulcanized rubber are compounds of the type

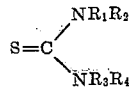

where $R_1$, $R_2$, $R_3$ and $R_4$ are hydrogen atoms or alkyl groups or heterocyclic compounds of the type

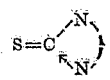

wherein the two nitrogen atoms form part of the ring structure. Compounds having either of the above groupings and having at least one hydrogen atom directly attached to one of the nitrogen atoms are sometimes considered to have the structure of the corresponding tautomer and are named accordingly.

Examples of compounds which may be used in the present invention are thiourea; substitute thioureas, particularly alkylated thioureas, e. g. methyl thiourea, N,N'-diethylthiourea and allyl thiourea; and heterocyclic thiocarbonyl compounds, especially heterocyclic thiocarbonyl compounds wherein the carbon atom of the thiocarbonyl group forms part of a five or six-membered ring e. g. 1,2-dihydroimidazole-2-thione (commonly known by the name of its tautomer 2-mercaptoimidazole), its homologues, 1,2 - dihydrobenzimidazole-2-thione (commonly known by the name of its tautomer 2-mercaptobenzimidazole) its homologues, 4-oxypyrimidine-2-thione (also known as uracil), its homologues and ethylene thiourea.

The mechanical working of the rubber can be carried out in the usual type of rubber-masticating apparatus, for example on rolls, in a Banbury mixer or in a Gordon plasticator, the presence of adequate oxygen during the mastication resulting from access of air to the rubber in the apparatus. Only a small proportion of the depolymerization promoter is needed. Suitable amounts of a thiocarbonyl compound as herein defined are from 0.05 part by weight to 5.0 parts by weight, preferably from 0.2 part to 1.0 part by weight, for every 100 parts by weight of rubber. The mechanical working may be effected at a temperature from 40° C. to 200° C. for a time depending on the proportion of the depolymerization promoter and the degree of softening required. It has been found that smoked sheet rubber can be softened to an extent making it suitable for compounding and processing in the customary manner by mechanically working it at from 50° C. to 190° C. for 5 to 15 minutes with from 0.2% to 1% by weight of the thiocarbonyl compound as herein defined.

Rubber softened in accordance with the invention has a less sticky surface than rubber which has been softened to the same extent by milling with a mercaptothiazole though it is tacky in the sense that two pieces of the softened rubber adhere well when pressed together. The thiocarbonyl compounds do not cause any substantial scorching of the rubber during subsequent compounding with sulphur and other compounding ingredients or during storage of the compounded unvulcanized rubber and thus rubber softened according to the present invention can be compounded more satisfactorily than rubber softened by mastication with mercaptothiazoles. The improvement is particularly marked in mixes containing furnace black, which is particularly liable to cause scorching. Thiourea and alkylated thioureas have the additional advantage of being cheap.

The invention is illustrated by the following examples, all parts being by weight.

Example 1

Smoked sheet rubber was masticated on a mill at 50° C. for 12 minutes with 0.2% by weight of thiourea as depolymerization promoter. The masticated rubber was tacky in the sense that two pieces of the same material adhered firmly when pressed together, but the surface of the rubber was not sticky. A 5% solution of the masticated rubber in benzene was then made and the viscosity of the sample determined and compared with the viscosity of a 5% solution in benzene of smoked sheet rubber which had been masticated on a mill for 12 minutes at 50° C. without any added depolymerization promoter. The results were as follows:

| Conditions of Mastication | Viscosity, Poises |
| --- | --- |
| No added depolymerization promoter | 1.98 |
| Addition of 0.2% thiourea | 1.21 |

Example 2

A batch of smoked sheet rubber was masticated in a Banbury mixer at 155° C. to 165° C. for 12 minutes with 0.3% of allyl thiourea as depolymerization promoter. For purposes of comparison a similar batch of smoked sheet rubber was masticated for 12 minutes under similar conditions but without the allyl thiourea. The time of extrusion of an equal amount of material from each masticated batch through an extrusion plastometer was noted and it was found that the material from the batch masticated without allyl thiourea took 0.64 minute to extrude while the material from the batch masticated with allyl thiourea took only 0.44 minute to extrude.

It is thus seen that the extrusion time of the batch of smoked sheet was reduced by over 31% by the addition of allyl thiourea indicating that the softness of the smoked sheet rubber was increased.

Example 3

Smoked sheet rubber was softened by mastication in a Banbury mixer for 8 minutes at 170° C. to 190° C. with 0.5% of 2-mercaptobenzimidazole as depolymerization promoter.

For comparison a batch of smoked sheet rubber was masticated in a Banbury mixer for 8 minutes at 170° C. to 190° C. without any added material, and a third batch of the smoked sheet rubber was masticated under the same conditions with an addition of 0.5% by weight of mercaptobenzthiazole (a known depolymerization promoter).

The softness of each of the batches of rubber was tested in an extrusion plastometer, the time being noted which was required to extrude a test piece of each rubber of the same predetermined dimensions. The sample of the batch masticated without any depolymerization promoter required 1.07 minutes, the sample of the batch masticated with 2-mercaptobenzimidazole required 0.50 minute, and the sample of the batch masticated with 0.5% of mercaptobenzthiazole required 0.55 minute.

The batch softened with the mercaptobenzthiazole had a very sticky surface, apparently due to the extrusion of a viscous liquid fraction from the interior of the softened mass, but the batch masticated with 2-mercaptobenzimidazole did not have a sticky surface though it was tacky in the sense that two pieces of the same material adhered firmly when pressed together.

Example 4

Smoked sheet rubber was masticated on a mill at 50° C. for 12 minutes with 0.2% by weight of 2-mercaptobenzimidazole as depolymerization promoter. A 5% solution of the masticated rubber in benzene was then made and the viscosity of the sample determined and compared with the viscosity of a 5% solution in benzene of smoked sheet rubber which had been masticated on a mill for 12 minutes at 50° C. without any added depolymerization promoter. The results were as follows:

| Conditions of Mastication | Viscosity, Poises |
| --- | --- |
| No added depolymerization promoter | 1.98 |
| Addition of 0.2% 2-mercaptobenzimidazole | 1.32 |

Example 5

Smoke sheet rubber was masticated as in Example 4 using 0.2% of thiouracil instead of 2-mercaptobenzimidazole. The viscosity of a 5% solution in benzene was 1.20 poises.

Example 6

A batch of smoked sheet rubber was masticated in a Banbury mixer at 155° C. to 160° C. for 12 minutes with 0.3% of 2-mercaptobenzimidazole. For purposes of comparison a similar batch of smoked sheet rubber was masticated for 12 minutes under similar conditions but without the 2-mercaptobenzimidazole and a third batch of smoked sheet rubber was masticated under similar conditions for 12 minutes with the addition of 0.3% of mercaptobenzthiazole. The time of extrusion of an equal amount of material from each of these three masticated batches through an extrusion plastometer was noted and it was found that the material from the batch masticated without either 2-mercaptobenzimidazole or mercaptobenzthiazole took 0.64 minute to extrude, the material from the batch masticated with mercaptobenzthiazole took 0.10 minute to extrude and the batch masticated with the 2-mercaptobenzimidazole took 0.17 minute to extrude.

The batch which had been masticated with the mercaptobenzthiazole had a very sticky surface while the batch masticated with 2-mercaptobenzimidazole did not have a sticky surface though it was tacky in the sense that two pieces of the same material adhered firmly when pressed together.

Example 7

A batch of smoked sheet rubber was masticated in a Banbury mixer at 155° C. to 165° C. for 12 minutes with 0.3% of ethylene thiourea. For purposes of comparison a similar batch of smoked sheet rubber was masticated for 12 minutes under similar conditions but without the ethylene thiourea. The time of extrusion of an equal amount of material from each masticated batch through an extrusion plastometer was noted and it was found that the material from the batch masticated without ethylene thiourea took 0.64 minute to extrude while the material from the batch masticated with ethylene thiourea took 0.40 minute to extrude.

It is thus seen that the extrusion time of the batch of smoked sheet was reduced by over 37% by the addition of ethylene thiourea and the softness of the smoked sheet rubber was therefore increased.

Having described our invention, what we claim is:

1. The process of claim 2 in which the thiocarbonyl compound is 2-mercaptobenzimidazole.

2. A process of softening unvulcanized rubber which comprises mechanically working the rubber in the presence of oxygen and a thiocarbonyl compound whose thiocarbonyl carbon atom is directly linked to two nitrogen atoms in a heterocyclic group of five, this heterocyclic ring compound of five members comprising two nitrogen and three carbon atoms.

CHARLES EDWIN KENDALL.
MANFRED LANDAU.

REFERENCES CITED

The following references are of record in the file of this patent:

UNITED STATES PATENTS

| Number | Name | Date |
|---|---|---|
| 1,559,925 | Winkelmann et al. | Nov. 3, 1925 |
| 2,018,643 | Williams et al. | Oct. 22, 1935 |
| 2,206,448 | Busse | July 2, 1940 |
| 2,234,848 | Horst | Mar. 11, 1941 |
| 2,347,966 | Roblin | May 2, 1944 |
| 2,366,316 | Davis | Jan. 2, 1945 |
| 2,544,746 | Baum | Mar. 15, 1951 |